J. FOSTER.
Instrument for Measuring Wheel Tires.
No. 56,546.   Patented July 24, 1866.
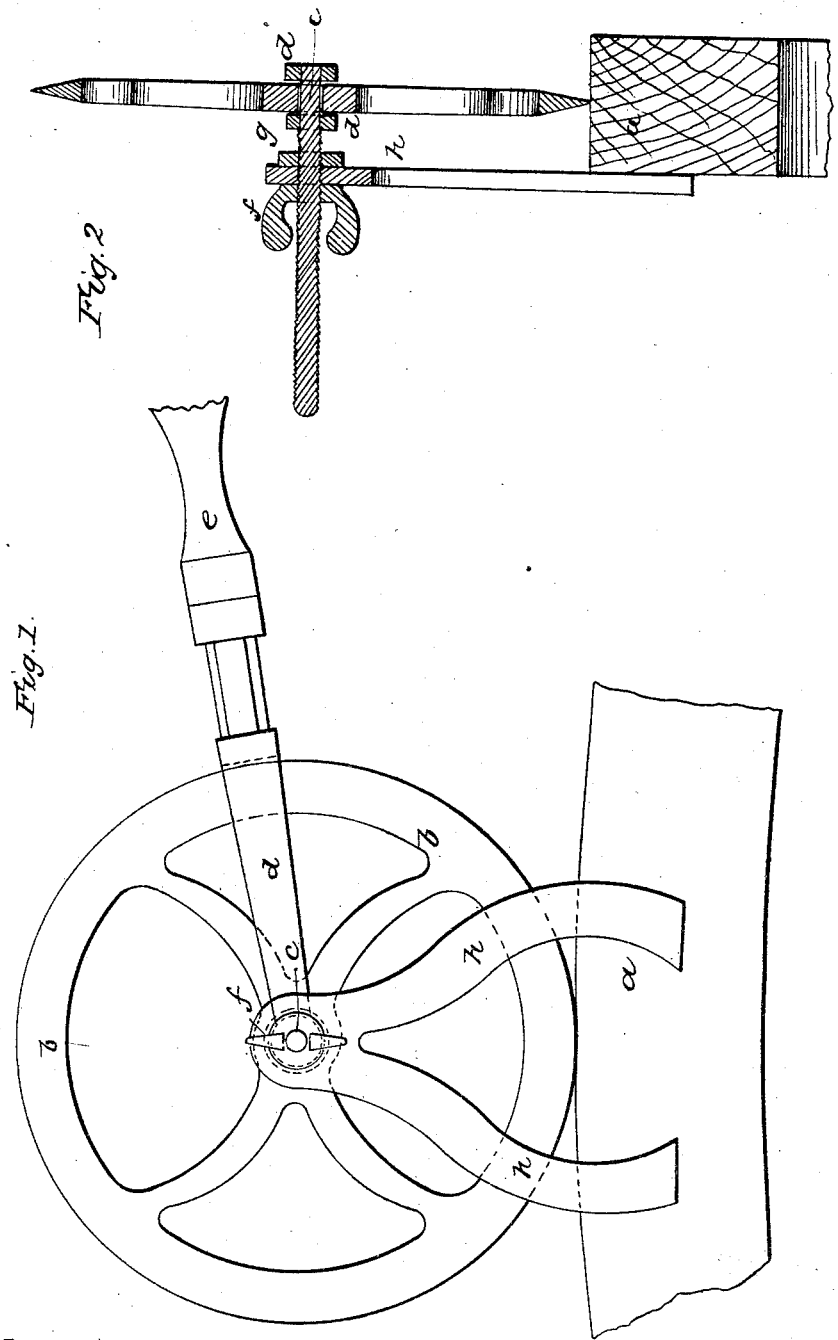

UNITED STATES PATENT OFFICE.

JUNIUS FOSTER, OF LONG BRANCH, NEW JERSEY.

IMPROVEMENT IN INSTRUMENTS FOR MEASURING TIRES OF WHEELS.

Specification forming part of Letters Patent No. 56,546, dated July 24, 1866; antedated July 15, 1866.

*To all whom it may concern:*

Be it known that I, JUNIUS FOSTER, of Long Branch, in the county of Monmouth and State of New Jersey, have invented, made, and applied to use a certain new and useful Improvement in Measures for Wheels and Tires; and I do hereby declare the following to be a full, clear, and exact description of the said invention, reference being had to the annexed drawings, making part of this specification, wherein—

Figure 1 is a plan of the said tire-measure as in use upon the edge of the rim or felly the wheel, and Fig. 2 is a cross-section of said measure.

Similar marks of reference denote the same parts.

In order to measure the external circumference of a wheel and the internal circumference of the tire, it has been usual to employ a small wheel set in a forked handle, upon the side of which a mark is placed, and another corresponding mark is made on the wheel or tire; then the said wheel is rolled around on the edge of the wheel or the inside of the tire and the number of revolutions counted, and a second mark put on the hand-wheel opposite the mark first put on the wheel or tire. By this means an accurate measurement is obtained whereby to determine whether the tire is the right size to be shrunk upon the wheel.

In taking this measure it is difficult to guide the hand-wheel exactly in the middle of the tire or the edge of the wheel, and in case the said hand-wheel is not guided with precision the measure will not be correct.

The nature of my said invention consists in a guide applied to this wheel so as to cause the same to run correctly around the center or middle portion of the wheel and tire, so as to correctly measure the same, said guide being made adjustable to suit varying widths of tires and fellies.

In the drawings, $a$ represents a portion of the rim or felly of a wheel. $b$ is the measuring-wheel, mounted on an axle, $c$, between the jaws or fork $d$, and $e$ is a handle, of any desired size or shape, receiving the end of the fork $d$, and which handle is grasped by the operative.

The axle $c$ is extended out in the form of a screw with nuts $f$ and $g$, between which is the eye of the guide-fork $h$. This fork may be adjusted by the nuts $f$ and $g$, so that when the side of the fork rests against the wheel, as seen in Fig. 2, the wheel $b$ will be made to travel in the middle part of the edge of the wheel, or in the same part of the inner circumference of the tire.

By means of this guide the workman is able to obtain a correct measure much more quickly, and there is no fear of the measuring-wheel running off the periphery of the wheel or inside of the tire or traveling in a crooked path.

What I claim, and desire to secure by Letters Patent, is—

The guide $h$, fitted as specified, in combination with the measuring-wheel $b$, for the purposes and as set forth.

In witness whereof I have hereunto set my signature this 14th day of October, 1865.

JUNIUS FOSTER.

Witnesses:
   GEO. D. WALKER,
   CHAS. H. SMITH.